(12) United States Patent
Yu et al.

(10) Patent No.: US 9,918,036 B2
(45) Date of Patent: Mar. 13, 2018

(54) SYSTEM AND METHOD FOR RECORDING AND DISTRIBUTING MEDIA CONTENT

(75) Inventors: Ke Yu, Alpharetta, GA (US); Nicholas P. Hill, Atlanta, GA (US); Troy C. Meuninck, Newnan, GA (US); William A. Brown, Woodstock, GA (US); Scott Morris, Decatur, GA (US); Ashwini Sule, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1140 days.

(21) Appl. No.: 12/264,098

(22) Filed: Nov. 3, 2008

(65) Prior Publication Data
US 2010/0111504 A1    May 6, 2010

(51) Int. Cl.
| | |
|---|---|
| *H04N 7/173* | (2011.01) |
| *H04N 5/76* | (2006.01) |
| *H04N 21/254* | (2011.01) |
| *H04N 21/2543* | (2011.01) |
| *H04N 21/258* | (2011.01) |

(Continued)

(52) U.S. Cl.
CPC .......... *H04N 5/76* (2013.01); *H04N 7/17318* (2013.01); *H04N 7/17336* (2013.01); *H04N 21/2541* (2013.01); *H04N 21/25435* (2013.01); *H04N 21/25825* (2013.01); *H04N 21/25833* (2013.01); *H04N 21/2747* (2013.01); *H04N 21/43622* (2013.01); *H04N 21/4728* (2013.01); *H04N 21/47202* (2013.01); *H04N 21/47214* (2013.01);

(Continued)

(58) Field of Classification Search
CPC ......... H04N 21/2747; H04N 21/43622; H04N 21/43615; H04N 21/47214; H04N 21/4135

USPC ......... 704/E19.049; 725/58, 80, 81, 86–104, 725/115, 134, 144–147, 62; 375/E7.198; 370/466; 348/553–558
See application file for complete search history.

(56) References Cited

U.S. PATENT DOCUMENTS 6,502,139 B1 * 12/2002 Birk et al. .................... 709/233
6,947,935 B1 *  9/2005 Horvitz et al. ................ 707/7
(Continued)

FOREIGN PATENT DOCUMENTS

| EP | 1217769 A1 | 6/2002 |
| WO | 2004114156 A1 | 12/2004 |
| WO | 2008106884 A1 | 9/2008 |

*Primary Examiner* — Nasser Goodarzi
*Assistant Examiner* — Patrick A Ryan
(74) *Attorney, Agent, or Firm* — Guntin & Gust, PLC; Matthew Tropper

(57) ABSTRACT

A system that incorporates teachings of the present disclosure may include, for example, a digital video recording (DVR) system having a controller to record video content supplied by an interactive television (iTV) communication system as directed by a plurality of users of the iTV communication system, receive from a communication device of one of the plurality of users a request for a portion of the recorded video content, identify a need to transcode the requested portion of the recorded video content according to one or more operating characteristics of the communication device, transcode the requested portion of the recorded video content to conform with the one or more operating characteristics of the communication device, and transmit to the communication device the transcoded video content. The DVR system can be located outside of the premises of each of the plurality of users. Other embodiments are disclosed.

25 Claims, 9 Drawing Sheets

(51) Int. Cl.
*H04N 21/2747* (2011.01)
*H04N 21/436* (2011.01)
*H04N 21/472* (2011.01)
*H04N 21/4728* (2011.01)
*H04N 21/658* (2011.01)
*H04N 21/835* (2011.01)

(52) U.S. Cl.
CPC ....... *H04N 21/6581* (2013.01); *H04N 21/835* (2013.01)

(56) References Cited

U.S. PATENT DOCUMENTS

| | | | | |
|---|---|---|---|---|
| 7,010,801 | B1* | 3/2006 | Jerding et al. | 725/95 |
| 7,382,879 | B1* | 6/2008 | Miller | 380/201 |
| 7,962,942 | B1* | 6/2011 | Craner | 725/88 |
| 2001/0047517 | A1* | 11/2001 | Christopoulos et al. | 725/87 |
| 2002/0092021 | A1* | 7/2002 | Yap et al. | 725/55 |
| 2002/0124182 | A1* | 9/2002 | Bacso et al. | 713/200 |
| 2002/0147687 | A1 | 10/2002 | Breiter et al. | |
| 2003/0149988 | A1* | 8/2003 | Ellis et al. | 725/87 |
| 2003/0192054 | A1* | 10/2003 | Birks et al. | 725/100 |
| 2004/0117440 | A1* | 6/2004 | Singer | G06F 21/10 709/203 |
| 2004/0143845 | A1 | 7/2004 | Lin et al. | |
| 2004/0193648 | A1* | 9/2004 | Lai et al. | 707/104.1 |
| 2004/0244032 | A1* | 12/2004 | Yamada | 725/25 |
| 2005/0022242 | A1* | 1/2005 | Rosetti et al. | 725/58 |
| 2005/0050578 | A1* | 3/2005 | Ryal | 725/143 |
| 2005/0166258 | A1 | 7/2005 | Vasilevsky et al. | |
| 2006/0020627 | A1* | 1/2006 | Poslinski | H04N 21/42661 |
| 2006/0218620 | A1 | 9/2006 | Nadarajah et al. | |
| 2008/0155615 | A1* | 6/2008 | Craner et al. | 725/91 |
| 2008/0199155 | A1* | 8/2008 | Hagens | H04N 7/141 386/291 |
| 2009/0300673 | A1* | 12/2009 | Bachet et al. | 725/31 |

* cited by examiner

200

500

600

SYSTEM AND METHOD FOR RECORDING AND DISTRIBUTING MEDIA CONTENT

FIELD OF THE DISCLOSURE

The present disclosure relates generally to recording and distribution of media content and more specifically to a system and method for recording and distributing media content.

BACKGROUND

Digital media recorders such as digital video recorders (also known as DVRs) have provided their users a means to record broadcast video content at the user's convenience. DVRs also provide their users the ability to forward through commercials to enhance the presentation experience of the recorded content.

Most DVRs can establish communications with an electronic programming guide of a media communication system to provide the user a convenient means to select video programs by title, episode name or other suitable forms of program identification. Once a video program is identified, the DVR can schedule recordings of the program on any broadcast channel as well as multiple broadcast channels of the media communication system.

DETAILED DESCRIPTION

One embodiment of the present disclosure can entail a digital video recording (DVR) system operating in an interactive television (iTV) communication system having a controller to record video content supplied by the iTV communication system as directed by a plurality of users of the iTV communication system, receive from a communication device of one of the plurality of users a request for a portion of the recorded video content, identify a need to transcode the requested portion of the recorded video content according to one or more operating characteristics of the communication device, transcode the requested portion of the recorded video content to conform with the one or more operating characteristics of the communication device, and transmit to the communication device the transcoded video content. The DVR system can be located outside of the premises of each of the plurality of users.

Another embodiment of the present disclosure can entail recording media content supplied by an interactive media communication system (iMCS) as directed by a plurality of users of the iMCS, receiving from a communication device of one of the plurality of users a request for a portion of the recorded media content, transcoding the requested portion of the recorded media content according to one or more operating characteristics of the communication device responsive to detecting a need to transcode the requested portion of the recorded media content, and transmitting the requested portion of the recorded media content as transcoded media content or media content without transcoding depending on whether the need to transcode is detected.

Yet another embodiment of the present disclosure can entail a communication device having a controller to submit a request to an iMCS for a portion of media content recorded by the iMCS, and receive from the iMCS the requested portion of the media content as transcoded media content. The iMCS can transcode the requested portion of the recorded media content according to one or more operating characteristics of the communication device, and can record the media content as directed by a plurality of users of the iMCS. Additionally, the communication device can belong to one of said plurality of users of the iMCS.

Figure 1:
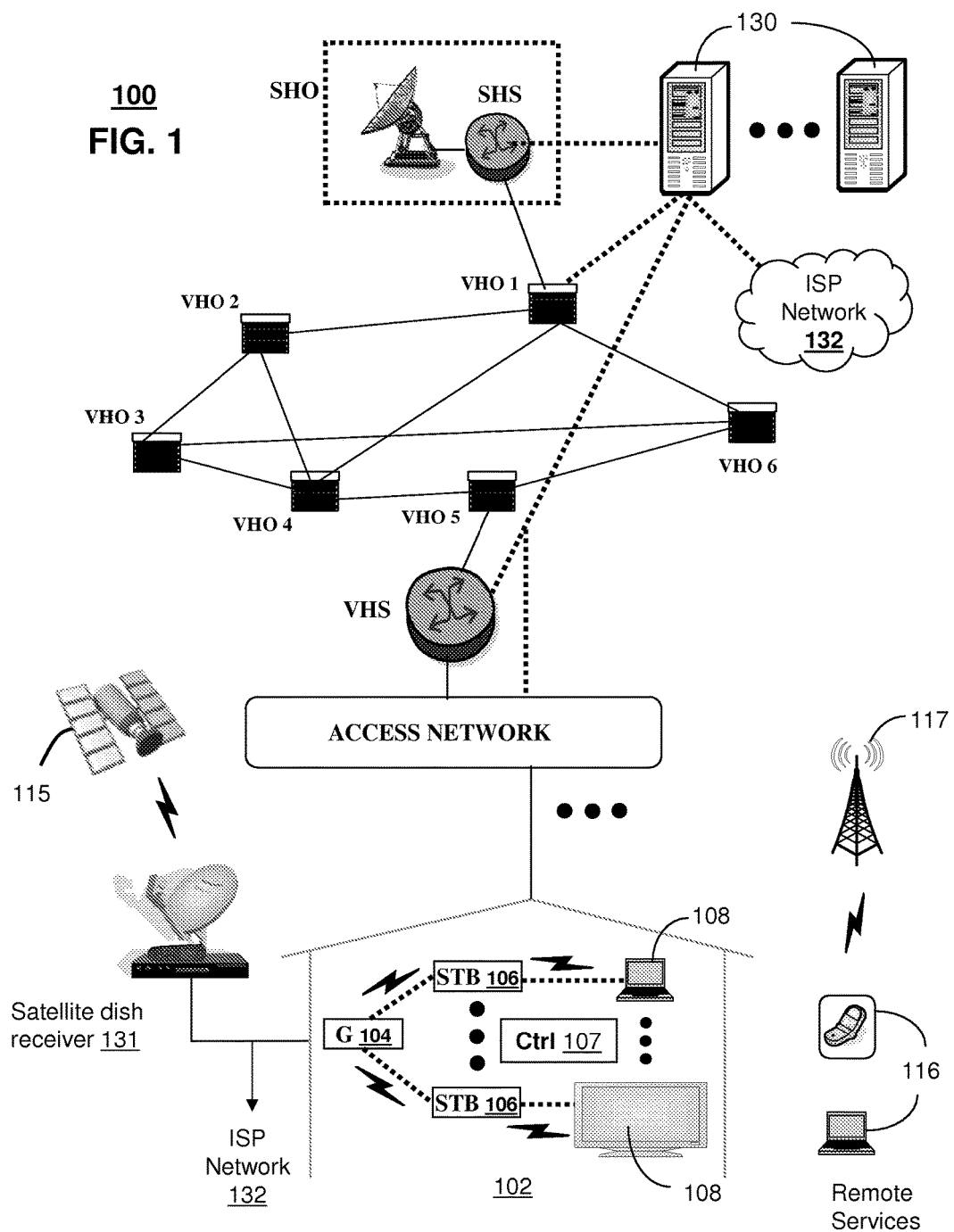
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

Another distinct portion of the one or more computing devices 130 can be used as a digital media recorder (DMR) system (herein referred to as DMR system 130) for recording media content (audio, video, text, still images, or combinations thereof) supplied by the first communication system 100. The DMR system 130 can also transcode portions of said recordings in conformance with the operating characteristics of the communication device when a determination is made that the communication device is incapable of processing high definition content. Once the information is transcoded, the DMR system 130 can transmit the transcoded content as streamed content or files to the requesting communication devices. Other operating functions of the DMR system 130 will be explained further in FIGS. 7-8.

To accomplish the above tasks, the DMR system 130 can utilize common recording technology to record media content delivered on broadcast channels by the first communication system 100. The DMR system 130 can also utilize common transcoding technology to transcode portions of the recorded media content so that it is compatible with the operating characteristics of a requesting communication device. The operating characteristics of the communication device analyzed by the DMR system 130 can include without limitation one or more operating parameters of a display of the communication device (such as screen resolution, color resolution, display dimensions, and so on), operating parameters of an audio system of the communication device (stereo audio, loud speaker audio, surround sound audio, etc.), available computing resources of the communication device (digital signal processor, video processor, microprocessor with dual core, etc.), operating parameters of a receiver of the communication device (such as download speed, quality of service requirements, communication protocol, etc.), and/or operating parameters of an operating system of the communication device (such Windows XP™, Vista™, PocketPC™, Macintosh™ OS, etc.). Other parameters that can have an affect on the quality of a media presentation at the communication device can also be addressed by the DMR system 130.

The DMR system 130 can request these operating parameters from the communication device requesting a portion of the recorded content, or can determine these characteristics from a user profile supplied by each user of the first communication system 100 and stored in a database of said system. Once the operating characteristics of a communication device have been determined by the DMR system 130, said system can transcode (if necessary) the requested portion of media content so that it conforms with said characteristics.

For example, if a mobile phone such as reference 116 is requesting a portion of recorded video content, the DMR system 130 can determine from the operating characteristics of the mobile phone that it cannot process a high definition recording of the requested content. The DMR system 130 can also determine from a download speed capability of the mobile phone that the requested content must be streamed at a minimum bit rate so that it satisfies a desired QoS policy established by the service provider of the first communication system 100 and/or the user of the communication device. Similar determinations can be made for other communication devices (desktop computer, laptop computer, gaming console, media player, etc.). In some instances where the requesting communication device has the resources and communication speed to process high definition content (such as an STB), the DMR system 130 can download the requested portion of the media content to the requesting device without transcoding.

In additional to the above functions, the DMR system 130 can also include a usage policy (such as a digital rights management or DRM policy) with the recorded media content when it is distributed to requesting communication devices. In cases where a portion of the requested media content already has a usage policy included in metadata supplied with said content, the DMR system 130 can transmit the usage policy (or a derivative thereof) with the transcoded content. If a usage policy is not available with a portion of recorded content, the DMR system 130 can add a usage policy defined by the service provider of the first communication system 100.

To accomplish the above tasks for a large community of users, the DMR system 130 can utilize one or more common server systems with extensive computing resources, storage systems for recording raw unencrypted full-resolution media content in standard or high definition resolution, and common software applications to perform transcoding functions, DRM policy functions, and media content management applications as will be described in FIGS. 7-8 below.

It should be noted that a communication device in the present context can represent a mobile phone such as reference 108 or 116, a laptop computer with WiFi, cellular, or WiMAX access such as references 108 or 116, an STB 106, a desktop computer located in building 102, or any other suitable media presentation device (such as a gaming console, a media player like an iPOD™, and so on) available to the users of the first communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
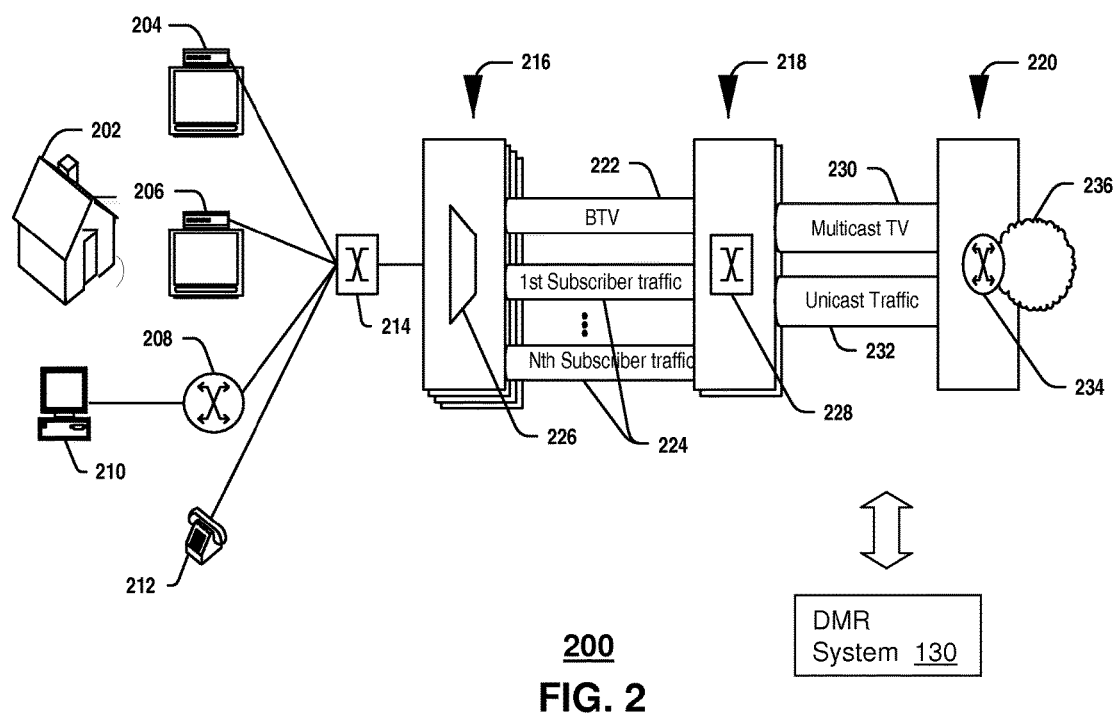

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The DMR system 130 of FIG. 1 can be operably coupled to the second communication system 200 for purposes similar to those described above.

Figure 3:
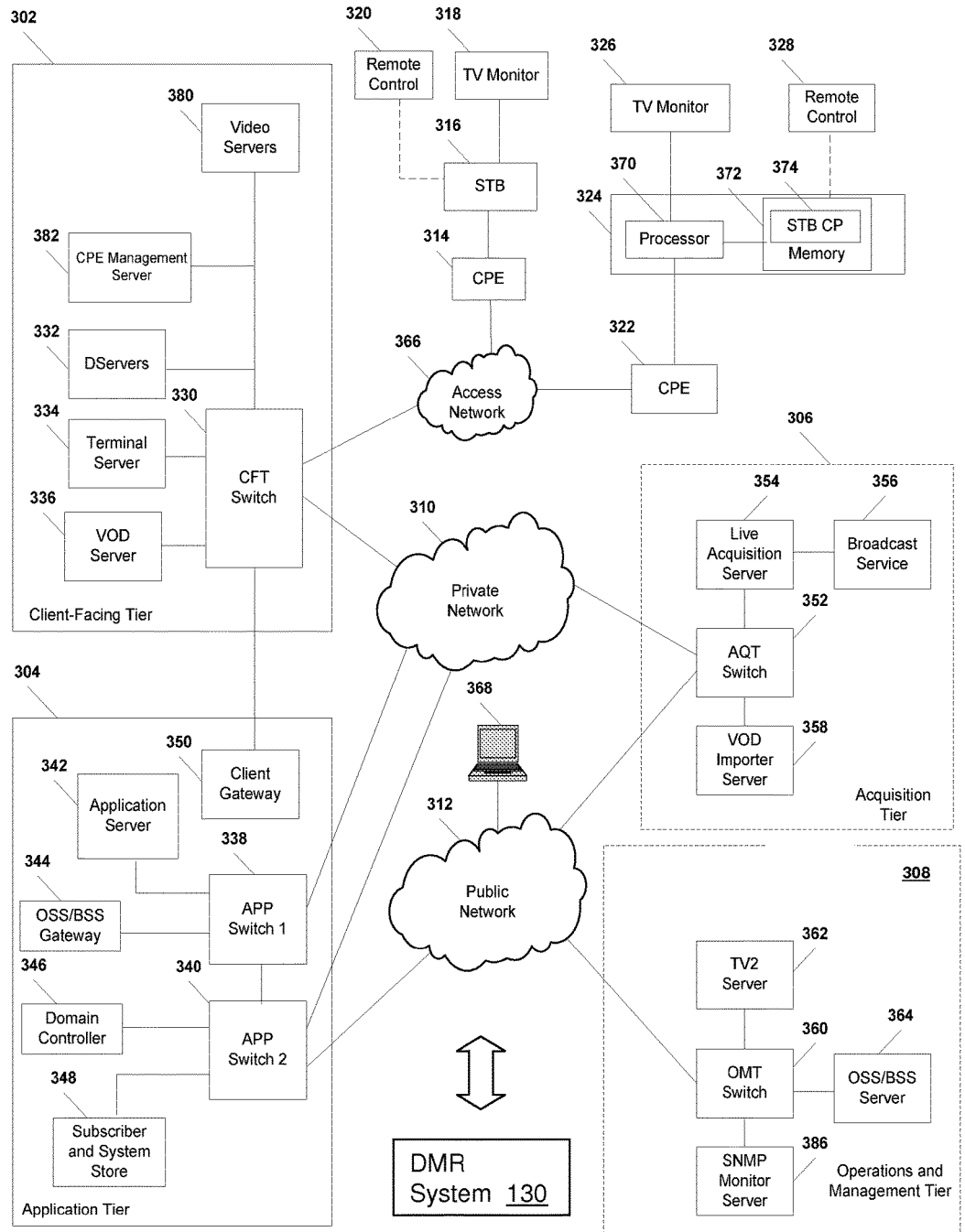

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The DMR system 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
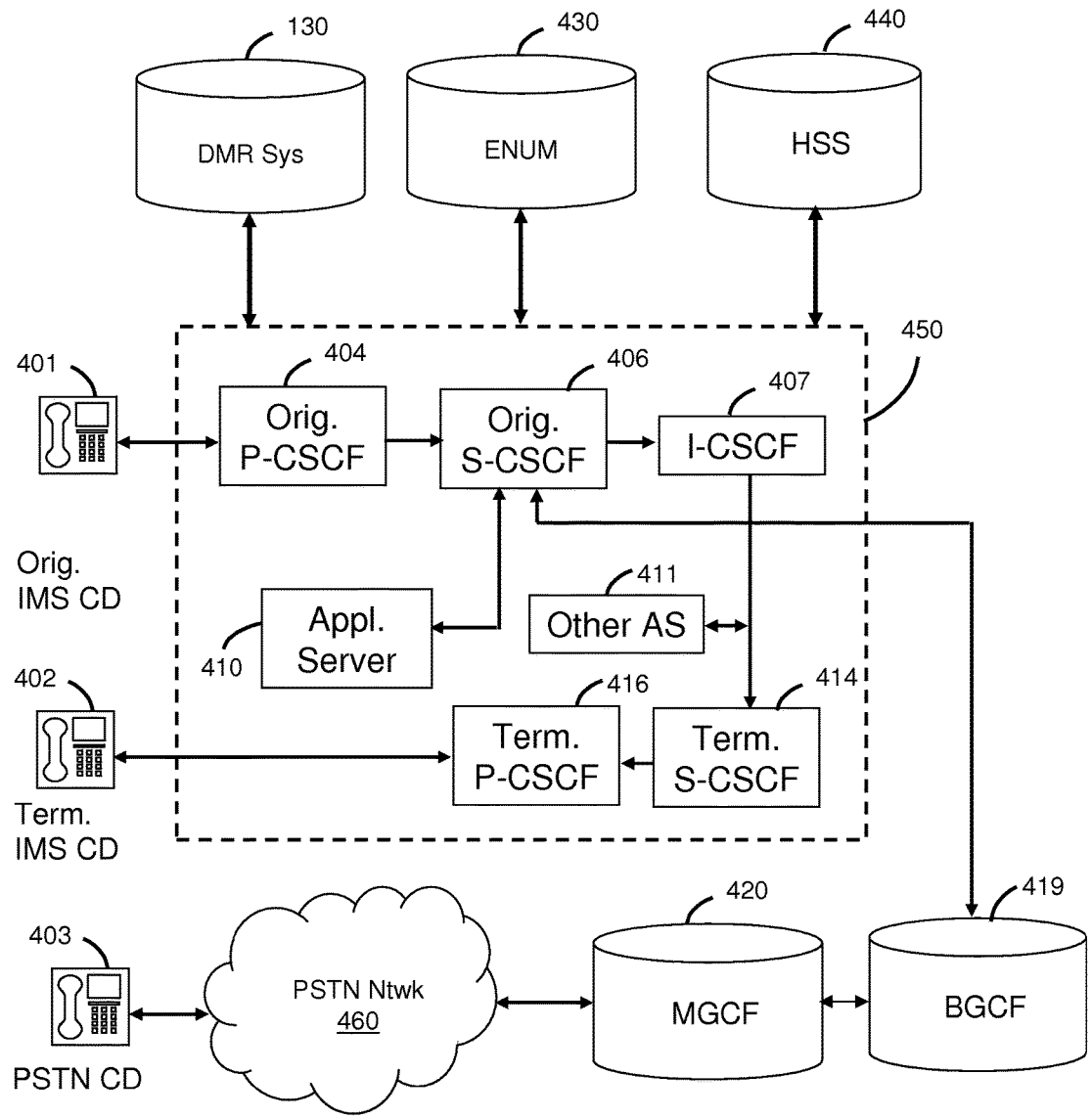

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the DMR system 130 previously discussed for FIG. 1. In this representative embodiment, the DMR system 130 can be accessed over a PSTN or VoIP channel of communication system 400 by common techniques such as described above.

Figure 5:
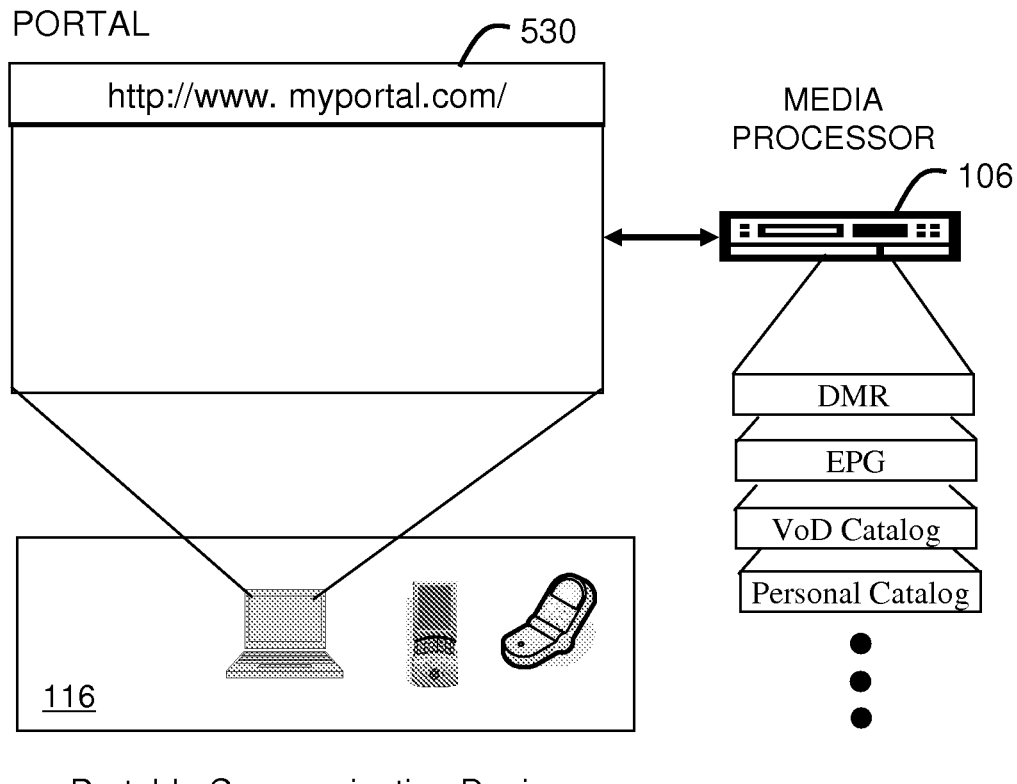
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as connectivity to the DMR system 130, an Electronic Programming Guide (EPG), VoD catalog, a personal catalog (such as personal videos, pictures, audio recordings, etc.) stored in the STB, a personal computer or server in a user's home or office, and so on. The portal 530 can also provide the user direct access to the DMR system 130 without a media processor as an intervening device.

Figure 6:
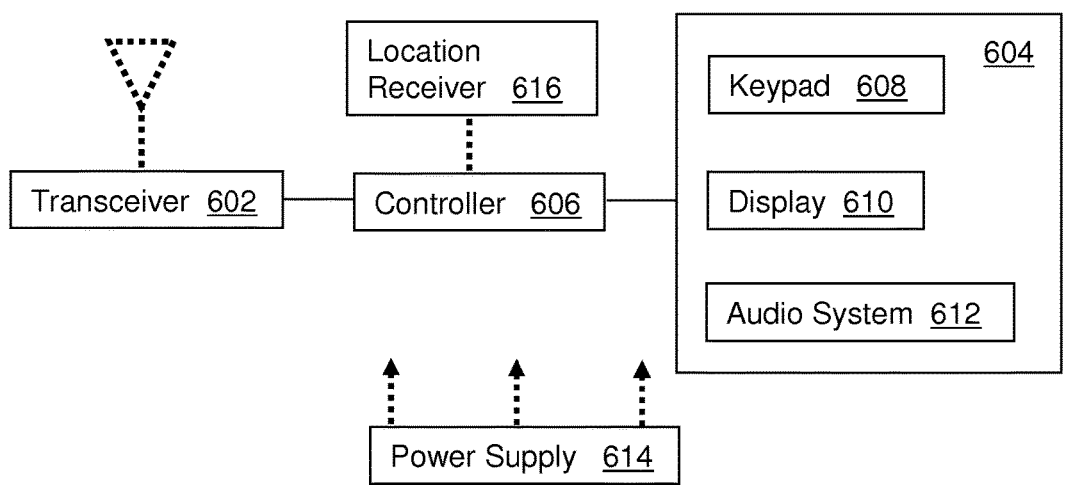
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, a location receiver 616, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The location receiver 616 utilize common location technology such as a global positioning system (GPS) receiver for identifying a location of the communication device 100, thereby facilitating common location services such as navigation. The controller 606 can utilize computing technologies such as a microprocessor and/or digital signal processor (DSP) with associated storage memory such a Flash, ROM, RAM, SRAM, DRAM or other storage technologies.

Figure 7:
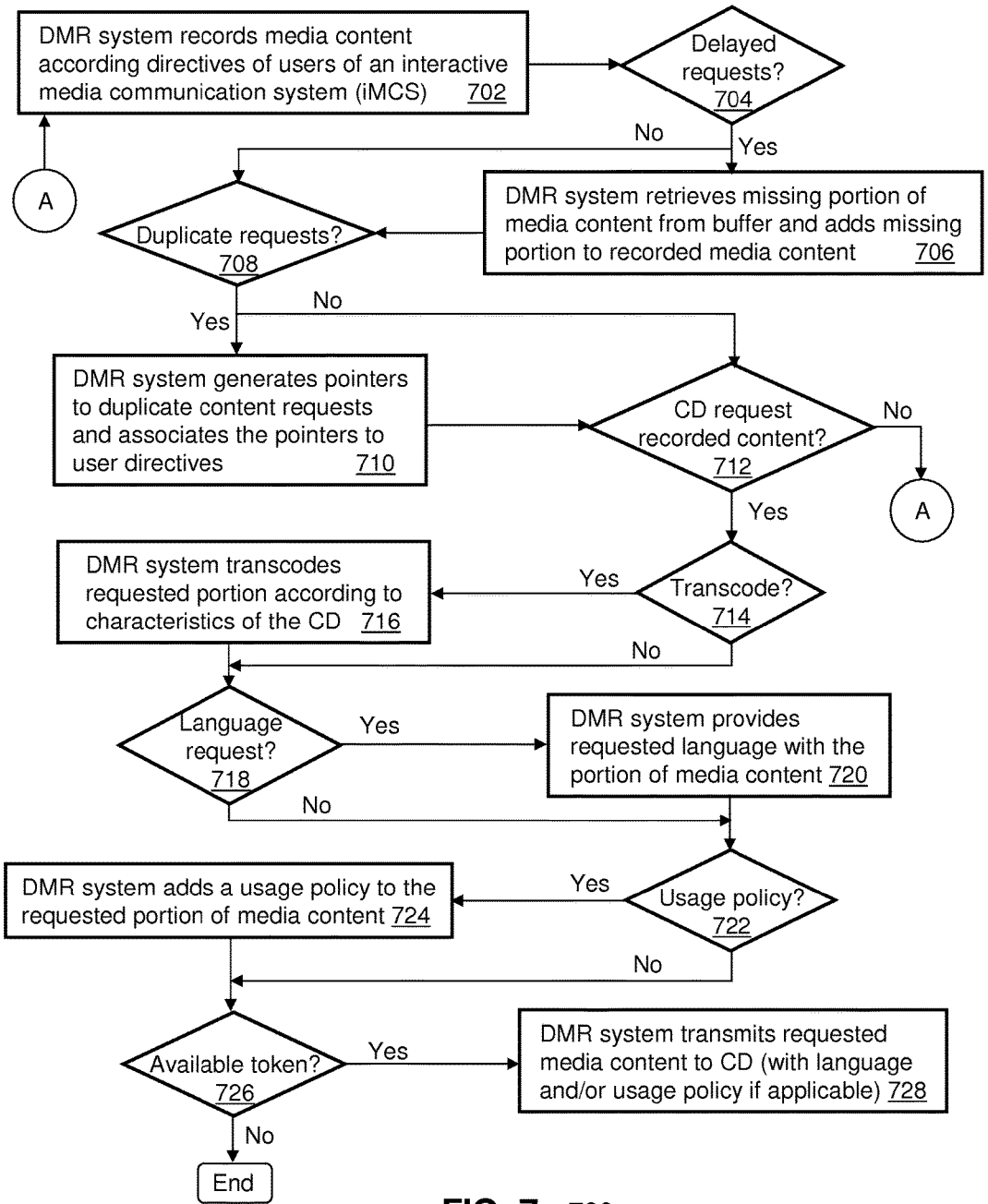
FIGS. 7-8 depict illustrative embodiments of methods operating in portions of the communication systems of FIGS. 1-4.

FIG. 7 depicts an illustrative method 700 operating in portions of communication systems 100-400. Method 700 begins with step 702 in which the DMR system 130 records media content according to directives of user of an interactive media communication system (iMCS) such as systems 100-400 described above in FIGS. 1-4. The media content recorded can be high definition audio, high definition video, text, still images, or combinations thereof. The directives to record this content can be received by the DMR system 130 from any communication device (an STB, a mobile phone, a computer, etc.) communicatively coupled to the iMCS directly or by way of portal 530. If the DMR system 130 detects in step 704 that a directive is received after the desired media content has started according to its broadcast schedule, the DMR system can proceed to step 706 where it can retrieve a missing portion of the media content from a buffer of the DMR system. The retrieved missing portion can be added by the DMR system 130 to the media content being recorded.

The DMR system 130 can utilize common storage technology (such as mass storage hard drives) to store scheduled media content from all (or a limited set of broadcast channels) in synchronicity with its broadcast schedule. The content stored can be limited to media content that iMCS users have not requested as a recording. The buffer can be large enough so that any media program can be recorded for at least a portion of its play time (such as 1 hour). The DMR system 130 can operate the buffer as a circular buffer that purges content between media schedules on each broadcast channel. By buffering unrequested media content, the DMR system 130 can provide users of the iMCS the ability to request a full recording of scheduled media content even when the directive is submitted after the scheduled start of said content. Since the DMR system 130 is a system of the service provider located outside of the premises of the users of the iMCS, the service provider can provide its users access to the vast recording resources of the DMR system.

To maintain an efficient management of recorded media content, the DMR system 130 can proceed to step 708 where it can check for duplicate recording requests. If a duplicate request is identified, the DMR system 130 can proceed to step 710 where it generates pointers for each duplicate content request and associates them to the user directives. With this technique, the DMR system 130 can record a single copy of media content that can be shared by several users of the iMCS.

In step 712, the DMR system 130 can monitor requests received from communication devices for a presentation of a portion of the recorded media content. As noted earlier, the communication device making the request can be a mobile phone, a media player, and STB, a desktop computer, a gaming console, or any other suitable communication device of a user that can interact with the iMCS. If no requests are detected, the DMR system 130 can proceed to step 702 and continue processing additional recording requests. Otherwise, the DMR system 130 can proceed to step 714 where it determines from the operating characteristics of the communication device whether media transcoding is required.

As was described earlier, the characteristics of the communication device can be any representative operating parameter of the communication device that can affect the presentation of the requested portion of media content (display, audio, computing resources, operating system, etc.). It should be further noted that the DMR system 130 can determine the operating characteristics of the communication device by requesting parameters from the communication device, retrieving a profile of the communication device established by the user and stored in a database of the DMR system, or by requesting a high level description of the communication device (such as a model and serial number) and retrieving the characteristics from a local or third party database indexed by this information. Other suitable methods for determining the operating characteristics of the communication device can be used by the DMR system 130.

If transcoding is not required such as when the requesting device is an STB, the DMR system 130 can proceed to step 718. If transcoding is required, the DMR system 130 can transcode in step 716 the requested portion of the recorded media content according to the characteristics of the communication device. For example, the DMR system 130 can transcode a high definition video recording to a lower resolution that conforms to a display dimension of the communication device. The DMR system 130 can also transcode the audio content so that it is suitable for the audio resources of the requesting device.

In step 718, the DMR system 130 can determine whether the request received from the communication device includes also a language identifier that identifies a desired presentation language that differs from the default language recorded in the requested portion of media content. For example, suppose the requested portion of media content is a video program presented originally in English. Further suppose the user of the communication device has submitted with the requested presentation a request to view the recorded media program with subtitles in Spanish, or dubbed in Spanish. If a language request is not detected, the DMR system 130 can proceed to step 722.

Otherwise, the DMR system 130 can proceed to step 720 where it provides the requested language with the recorded portion of the media content. This step can be accomplished by retrieving the requested language subtitles from metadata supplied with the media content at the time it was recorded or from a third party database that supplies subtitles in other languages. In the case of the dubbing request, the DMR system 130 can retrieve dubbed audio in the desired language from the recorded content if provided by the iMCS at the time the media content was recorded, or retrieve the dubbed audio from a third party database storing a number of retrievable dubbed languages for the content in question.

In step 722, the DMR system 130 can also determine if a usage policy was supplied with the requested portion of recorded media content. The usage policy can represent for example a digital rights management (DRM) policy supplied with metadata in the recorded media content. If a DRM policy is not supplied by the content provider of the requested portion of the recorded media content, the DMR system 130 can proceed to step 724 where it can add a content usage policy defined by the service provider of the iMCS. The service provider of the iMCS can define for example a usage policy that prevents the communication device from sharing the recorded media content with other devices. If a usage policy has been provided with the recorded media content, the DMR system 130 can supply the same policy with the recorded content or a derivative thereof.

The DMR system 130 can further manage the distribution of the requested media content with a token system. For example, the DMR system 130 can identify in step 726 a token account associated with the user of the communication device. The token account can include a finite number of tokens which can limit how many copies of the requested media content can be distributed, and/or how many communication devices of the user can request the same content. The DMR system 130 can expend a token for each copy of the requested content, and/or each communication device of the user requesting the same recorded media content. If the user has a limited number of tokens, and all tokens have been used, then the DMR system 130 can terminate the transaction and notify the user by way of the communication device that the token account has no further tokens. The service provider can utilize token accounts to not only limit the distribution of recorded media content, but also as a revenue source by charging a fee for each additional token requested by the users of the iMCS.

If the DMR system 130 detects the availability of a token, it tags the selected token as expired, and proceeds to step 728 where it transmits the requested portion of the recorded media content to the communication device, transcoded if necessary, with the requested language (if any) and a usage policy. Depending on the transmission speed and resource capabilities of the communication device, the DMR system 130 can transmit the transcoded content as a file, or as streamed content using a real-time protocol (RTP) or other suitable communication technology to provide a reliable presentation of the content.

Figure 8:
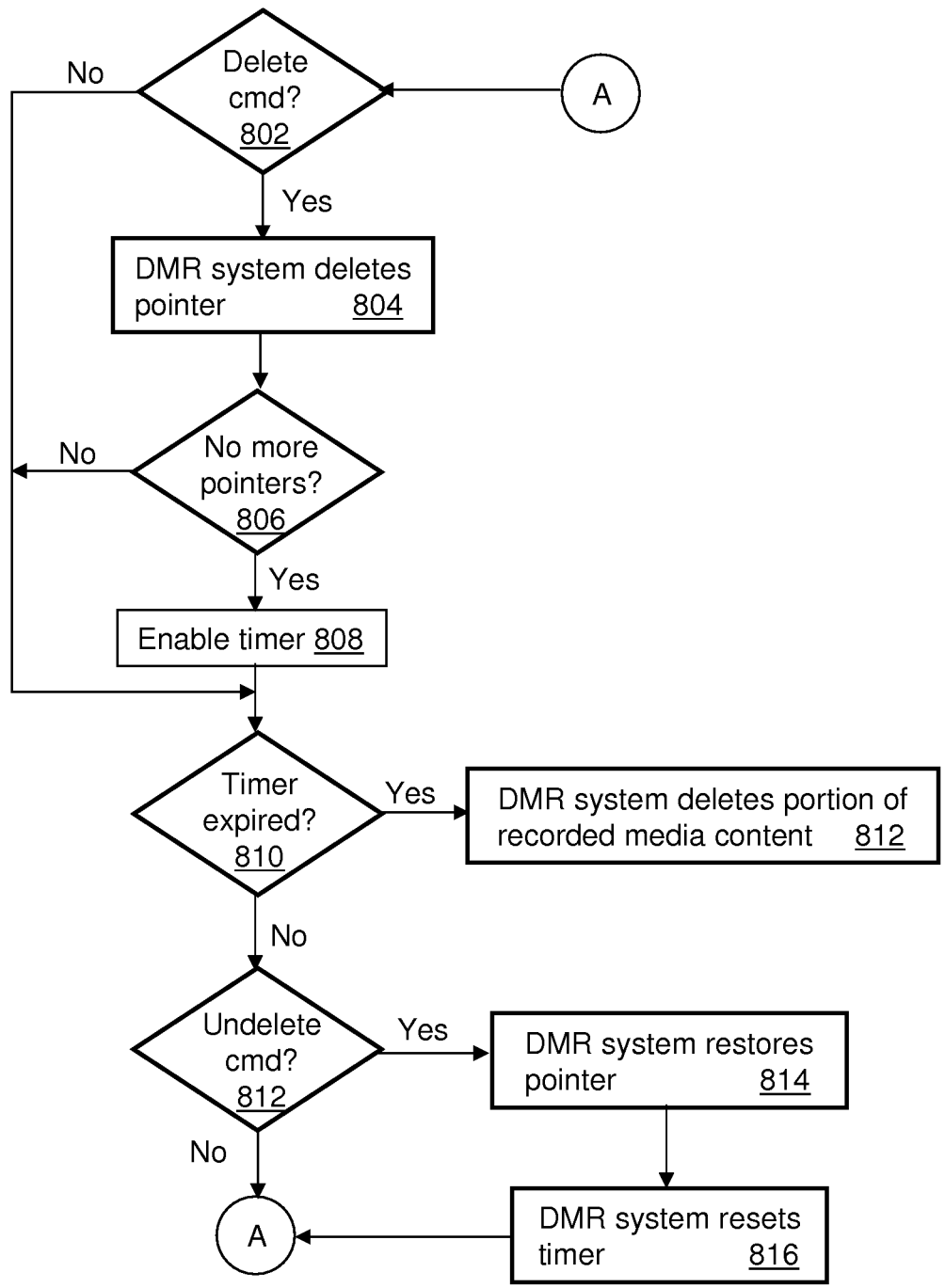

Method 800 of FIG. 8 describes a background process that can be employed by the DMR system 130 to manage the recorded media content. For example, the DMR system 130 can monitor in step 802 deletion commands submitted by a communication device of the user. If a deletion command is detected, the DMR system 130 can proceed to step 804 where it deletes a pointer associated with a portion of the recorded content which was recorded responsive to a directive of the user as described in step 702 of FIG. 7. If more than one pointer exists to the same portion of recorded content, then the removal of the pointer of one user does not affect access by other users with active pointers to the same recorded content. In step 806, the DMR system 130 can determine if there are no additional active pointers associated with the media content. This step represents a situation where all the users who had requested the portion of media content to be recorded have all submitted a deletion request, which in turn removed all pointers to the recorded content in step 804.

If such situation is detected, the DMR system 130 can proceed to step 808 where it enables a timer before it permanently deletes the recorded media content. This timer can be set by the service provider of the iMCS to any time that may be deemed reasonable (1 hour, 24 hours, etc.). By preventing the immediate deletion of the recorded media content, the iMCS provides its users time to change their mind and restore access to the recorded media content that was previously deleted by the removal of a pointer to said content. In step 810, the DMR system 130 can determine if the timer has expired. If it has, the DMR system 130 can delete in step 812 the portion of the recorded media content with no active pointers.

If the timer has not expired, the DMR system 130 can determine in step 812 whether it has received undelete commands from the users that previously submitted a deletion command. If an undelete command is detected, the DMR system 130 can proceed to step 814 where it restores the pointer (same or new one) for the user requesting to restore the recorded media content. The DMR system 130 in step 816 can reset the timer since at least one active pointer is associated with the recorded media content. Method 800 can continue from step 802 for subsequent deletion and restoration requests.

Upon reviewing the aforementioned embodiments, it would be evident to an artisan with ordinary skill in the art that said embodiments can be modified, reduced, or enhanced without departing from the scope and spirit of the claims described below. For example, a service provider of the iMCS can have more than one DMR system 130. Each DMR system 130 can be assigned to a region (North East, South East, Central, Mountain, etc.). In this embodiment, DMR systems 130 can communicate with each other and share resources. For instance, if a user requests restoration of recorded media content after the timer of step 810 has expired, the DMR system 130 can query other DMR systems for the same content. Similarly, the DMR systems 130 can share storage resources with each other in situations where one or more DMR systems are in comparison to others.

In yet another embodiment, the functions of the DMR system 130 can be reduced to less than what has been described in the present disclosure. For example, the DMR system 130 can be limited to recording video programs, while performing the functions described by methods 700-800. In this embodiment, the DMR system 130 can be said to operate as a digital video recorder (DVR) system. Thus, a service provider of an iMCS can deploy more than one derivative of a DMR system 130 depending on the needs of its users.

In another embodiment, the iMCS can represent other communication systems not described in the present disclosure. For example, the iMCS can represent a radio communication system with the ability to provide its users a request for radio programming on demand, and/or at least access to broadcast radio programs from a variety of radio station sources (locally, nationally, and/or internationally). The DMR system 130 can be directed by the users of the iMCS to record scheduled radio programs and/or radio programs selectively requested, and perform the functions of FIGS. 7-8 as described earlier.

It follows from this illustration that the iMCS can represent any communication system that provides media content in any form with an ability for its users to have an interactive component such as an ability to request content, select broadcast channels, and so on. Accordingly, communication systems that provide gaming content, audio content (books, music, etc.), and other suitable forms of media content can be applied to the present disclosure.

In another embodiment, the DMR system 130 can be located in the premises of users of the iMCS. In this embodiment, the service provider of the iMCS can distribute DMR systems 130 to its users, which the users can locate in their home or workplace. Methods 700-800 of FIGS. 7-8 can be adapted for the DMR systems 130 of said users. For example, in the case of a multi-user household (or enterprise setting), the DMR system 130 can be adapted to perform the storage management functions of method 700 (using pointers to avoid duplicate recording) as well as the other functions described by methods 700-800. Additionally, the DMR systems 130 of users located in different premises can be programmed to intercommunicate for the purpose of sharing computing and storage resources, as well as sharing recorded media content. Thus when a user of one premise deletes a copy of a recorded media content (with no other active pointers), and the timer of step 810 has expired, the DMR system 130 of said user can query DMR systems of other users to determine whether another copy of the recorded media content is available. If one is found, the DMR system 130 of the user can retrieve this copy, and effectuate a undelete command that would otherwise not be possible.

Other suitable modifications can be applied to the present disclosure without departing from the scope of the claims below. Accordingly, the reader is directed to the claims section for a fuller understanding of the breadth and scope of the present disclosure.

Figure 9:
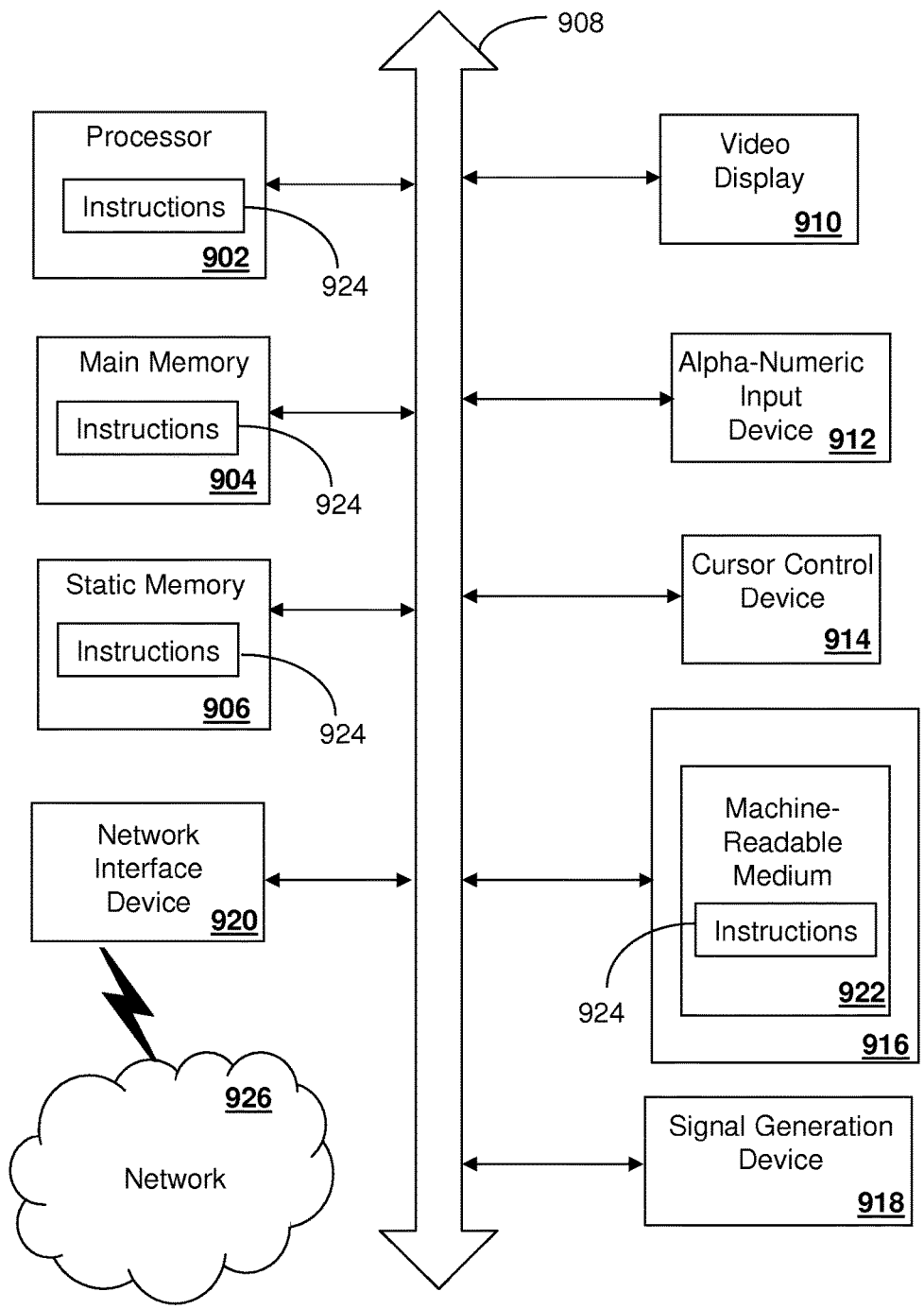
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first digital video recording system operating in an interactive television communication system, comprising:
a memory to store executable instructions; and
a processor coupled to the memory, wherein the processor, responsive to executing the executable instructions, performs operations comprising:
recording video content that is supplied by the interactive television communication system to store recorded video content, wherein a portion of the video content is recorded as directed by a plurality of requests by a plurality of users of the interactive television communication system, and wherein the first digital video recording system is located outside of premises of each of the plurality of users;
receiving, from a device of a user of the plurality of users, a request for a selection from the recorded video content to identify a requested portion;
transmitting to the device the requested portion of the recorded video content;
in accordance with receiving a delete command from the device to delete the requested portion of the recorded video content:
deleting a pointer associated with the requested portion of the recorded video content to prevent the user from subsequently accessing the requested portion of the recorded video content;
determining whether the first digital video recording system comprises no additional pointers to the requested portion of the recorded video content; and
initiating a timer responsive to deleting the pointer and responsive to when it is determined that the first digital video recording system comprises no additional pointers to the requested portion of the recorded video content;
in accordance with receiving an undelete command from the device of the user to restore access to the requested portion of the recorded video content:
in response to determining by the timer that a predetermined time period has not expired, restoring the pointer or generating a first new pointer to permit the user to subsequently access the requested portion of the recorded video content; and
in response to determining by the timer that the predetermined time period has expired, generating a second new pointer that points to content at a second digital video recording system, thereby effectuating the undelete command, wherein the content at the second digital video recording system corresponds to the requested portion of the recorded video content and was not previously stored at the first digital video recording system;
transcoding the requested portion of the recorded video content to conform with an operating characteristic of the device, wherein the operating characteristic of the device corresponds to an operating parameter of a display of the device, an audio system of the device, a computing resource of the device, a receiver of the device, or a type of operating system used by the device;
determining the operating characteristic of the device by requesting parameters from the device; and
detecting a language identifier in the request for the requested portion of the recorded video content;
wherein the transcoding the requested portion of the recorded video content is further according to the language identifier.

2. The first digital video recording system of claim 1, wherein the processor comprises a plurality of processors operating in a distributed processing environment.

3. The first digital video recording system of claim 1, wherein the requested portion of the recorded video content is transmitted as streaming content.

4. The first digital video recording system of claim 1, wherein the operations further comprise:
identifying a plurality of duplicate video recording requests initiated by the plurality of users for a video program supplied by the interactive television communication system; and
recording a single copy of the video program.

5. The first digital video recording system of claim 1, wherein the interactive television communication system corresponds to one of an interactive cable television communication system or an interactive satellite television communication system.

6. The first digital video recording system of claim 1, wherein the operations further comprise:
detecting metadata in the requested portion of the recorded video content that includes a content usage policy; and
transmitting to the device the content usage policy or a derivative thereof.

7. The first digital video recording system of claim 6, wherein the content usage policy corresponds to a digital rights management policy.

8. The first digital video recording system of claim 1, wherein the operations further comprise:
detecting a lack of a usage policy in the recorded video content; and
transmitting to the device a service provider usage policy or a derivative thereof.

9. The first digital video recording system of claim 1, wherein the language identifier comprises a first request to supply subtitles with the requested portion of the recorded video content in a specified language or a second request to dub an audio portion of the requested portion of the recorded video content in the specified language.

10. The first digital video recording system of claim 1, wherein the pointer is associated with a previously recorded directive of the user to record the requested portion of the recorded video content.

11. The first digital video recording system of claim 10, wherein the operations further comprise:
generating the first new pointer to the requested portion of the recorded video content; and
associating the first new pointer with the user, wherein the first new pointer enables the user to subsequently access the requested portion of the recorded video content.

12. The first digital video recording system of claim 10, wherein the predetermined time period is set by a service provider of the interactive television communication system.

13. The first digital video recording system of claim 12, wherein the operations further comprise:
resetting the timer responsive to receiving the undelete command.

14. The first digital video recording system of claim 1, wherein the operations further comprise:
receiving a directive from one of the plurality of users to record first video content, wherein the directive is received at a time subsequent to a start time of the first video content; and
recording the first video content at or near the time the directive was received.

15. The first digital video recording system of claim 14, wherein the operations further comprise:
recording, in a buffer, broadcast video content from a plurality of broadcast channels distributed by the interactive television communication system; and
retrieving a missing portion of the first video content from the buffer.

16. A method comprising:
recording, by a first system comprising a processor, media content that is supplied by an interactive media communication system to store recorded media content, wherein a first portion of the media content is recorded as directed by a plurality of requests by a plurality of users of the interactive media communication system;
receiving, by the first system, from a mobile phone of a user of the plurality of users a request for a selection from the recorded media content to identify a requested portion;
detecting, by the first system, a need to transcode the requested portion of the recorded media content;
transcoding, by the first system, the requested portion of the recorded media content according to an operating characteristic of the mobile phone responsive to detecting the need to transcode the requested portion of the recorded media content to thereby generate transcoded media content;
transmitting, by the first system, the one of the transcoded media content or the requested portion of the media content;
in accordance with receiving, by the first system, a delete command from the mobile phone to delete the requested portion of the recorded media content:
deleting, by the first system, a pointer associated with the requested portion of the recorded media content to prevent the user from subsequently accessing the requested portion of the recorded media content;
determining, by the first system, whether the first system comprises no additional pointers to the requested portion of the recorded media content;
initiating, by the first system, a timer responsive to deleting the pointer when it is determined that the first system comprises no additional pointers to the requested portion of the recorded media content;
deleting, by the first system, the requested portion of the recorded media content upon expiration of a predetermined time period;
in accordance with receiving, by the first system, an undelete command from the mobile phone of the user to restore access to the requested portion of the recorded media content:
in response to determining by the timer that the predetermined time period has not expired, restoring, by the first system, the pointer to permit the user to subsequently access the requested portion of the recorded media content; and
in response to determining by the timer that the predetermined time period has expired, generating, by the first system, a new pointer that points to content at a second system to effectuate the undelete command, wherein the content at the second system corresponds to the requested portion of the recorded media content and was not previously stored at the first system;
transcoding the requested portion of the recorded media content to conform with an operating characteristic of the mobile phone, wherein the operating characteristic of the mobile phone corresponds to an operating parameter of a display of the mobile phone, an audio system of the mobile phone, a computing resource of the mobile phone, a receiver of the mobile phone, or a type of operating system used by the mobile phone;
determining the operating characteristic of the mobile phone by requesting parameters from the mobile phone; and
detecting a language identifier in the request for the requested portion of the recorded media content;
wherein the transcoding the requested portion of the recorded media content is further according to the language identifier.

17. The method of claim 16, wherein the second system is located outside of premises of each of the plurality of users, wherein the recorded media content corresponds to one of recorded audio content, recorded video content, or combinations thereof, and wherein the interactive media communication system corresponds to one of an interactive radio communication system, an interactive gaming communication system, an interactive cable television communication system, or an interactive satellite television communication system.

18. A mobile phone, comprising:
a memory to store executable instructions; and
a processor coupled to the memory, wherein the processor, responsive to executing the executable instructions, performs operations comprising:
submitting a request to a first interactive media communication system for media content supplied by the first interactive media communication system to identify a requested portion of the media content, wherein the first interactive media communication system records a portion of the media content that is supplied as directed by a plurality of requests by a plurality of users of the first interactive media communication system to thereby store recorded media content, and wherein the mobile phone belongs to a user of the plurality of users;
receiving from the first interactive media communication system the requested portion of the media content as transcoded media content, wherein the first interactive media communication system transcodes the requested portion of the recorded media content according to an operating characteristic of the mobile phone;
transmitting a delete command to the first interactive media communication system to delete a pointer associated with the requested portion of the recorded media content to prevent subsequent access to the requested portion of the recorded media content, wherein the first interactive media communication system determines whether any additional pointer associated with the requested portion of the recorded media content remains associated with the requested portion of the recorded media content and, in response to determining that no pointers remain associated with the requested portion of the recorded media content, initiates a timer and deletes the requested portion of the recorded media content upon expiration, determined by the timer, of a predetermined time period;

transmitting an undelete command to the first interactive media communication system to restore access to the requested portion of the recorded media content, wherein the first interactive media communication system, in response to determining by the timer that the predetermined time period has not expired, restores the pointer to permit the user to subsequently access the requested portion of the recorded media content and, in response to determining by the timer that the predetermined time period has expired, generates a new pointer that points to content at a second interactive media communication system to effectuate the undelete command, wherein the content at the second interactive media communication system corresponds to the requested portion of the recorded media content and was not previously stored at the first interactive media communication system; and transmitting the operating characteristic of the mobile phone to the first interactive media communication system in response to a request for the operating characteristic of the mobile phone.

19. The mobile phone of claim 18, wherein the processor comprises a plurality of processors operating in a distributed processing environment.

20. The first digital video recording system of claim 1, wherein the operations further comprise:

in response to determining that the first digital video recording system comprises no additional pointers to the requested portion of the recorded video content, deleting the requested portion of the recorded video content upon expiration of the predetermined time period.

21. The first digital video recording system of claim 1, wherein the operations further comprise:

in response to determining that the predetermined time period has expired, querying the second digital video recording system to determine if the content corresponding to the requested portion of the recorded video content is available; and retrieving the content from the second digital video recording system.

22. The first digital video recording system of claim 1, wherein the operations further comprise:

managing a token account associated with the user, the token account including a limited number of tokens, to limit a number of copies of the selection that can be distributed to communication devices associated with the user, a number of communication devices associated with the user that can request the selection, or a combination thereof, wherein a distribution of each copy of the selection to any of a plurality of communication devices associated with the user comprises an expenditure from the token account; and recording in the token account a fee for each token that is expended.

23. The first digital video recording system of claim 22, wherein the token account includes a plurality of tokens and wherein each token of the plurality of tokens can be used to request any portion of the recorded video content.

24. The first digital video recording system of claim 4, wherein the operations further comprise:

generating a plurality of pointers to the single copy of the video program; and associating the plurality of pointers with the plurality of duplicate video recording requests.

25. The first digital video recording system of claim 14, wherein the operations further comprise:

identifying a missing portion of the first video content; and adding the missing portion to the first video content that is recorded.

* * * * *